United States Patent [19]
Perilstein

[11] 4,220,989
[45] Sep. 2, 1980

[54] POLYPHASE VARIABLE FREQUENCY INVERTER WITH OUTPUT VOLTAGE CONTROL

[76] Inventor: Fred M. Perilstein, 676 Park Ave., East Orange, N.J. 07017

[21] Appl. No.: 967,646

[22] Filed: Dec. 8, 1978

[51] Int. Cl.² ........................................... H02P 13/18
[52] U.S. Cl. ..................... 363/96; 363/124; 363/138
[58] Field of Search ................. 363/96, 124, 135–138

[56] References Cited

U.S. PATENT DOCUMENTS

| | | | |
|---|---|---|---|
| 3,460,021 | 8/1969 | Schlabach | 363/138 |
| 3,469,169 | 9/1969 | Schlabach et al. | 363/138 |
| 3,502,957 | 3/1970 | Fried et al. | 363/135 |
| 3,504,266 | 3/1970 | Schlabach et al. | 363/138 |
| 3,538,419 | 11/1970 | Seki et al. | 363/136 X |
| 3,538,420 | 11/1970 | Klein | 363/96 X |
| 3,848,176 | 11/1974 | Etter | 363/96 |
| 4,146,921 | 3/1979 | Akamatsu | 363/138 |

*Primary Examiner*—J. D. Miller
*Assistant Examiner*—Peter S. Wong
*Attorney, Agent, or Firm*—Norman N. Popper; Daniel H. Bobis

[57] ABSTRACT

A polyphase variable frequency inverter with output voltage control provides a polyphase AC output from a constant potential DC supply, and comprises a chopper circuit and an inverter circuit. The chopper circuit further comprises a silicon controlled rectifier in parallel with a reverse biased diode. The anode of the silicon controlled rectifier and the cathode of the reverse biased diode are connected to the positive terminal of the constant potential DC supply while the cathode of the silicon controlled rectifier and the anode of the reverse biased diode are connected to the respective silicon controlled rectifiers and reverse biased diodes of the inverter circuit. The inverter circuit further comprises a plurality of branches, each including a first silicon controlled rectifier in series with a second silicon controlled rectifier, each such silicon controlled rectifier having in parallel therewith a reverse biased diode. The polyphase AC output is derived from the mid-point junctions of the respective silicon controlled rectifier-reverse biased diode branches of the inverter circuit. It is a feature of a specific embodiment of the present invention that the inverter circuit exhibits a constant RMS polyphase AC output voltage to frequency slope characteristic.

8 Claims, 7 Drawing Figures

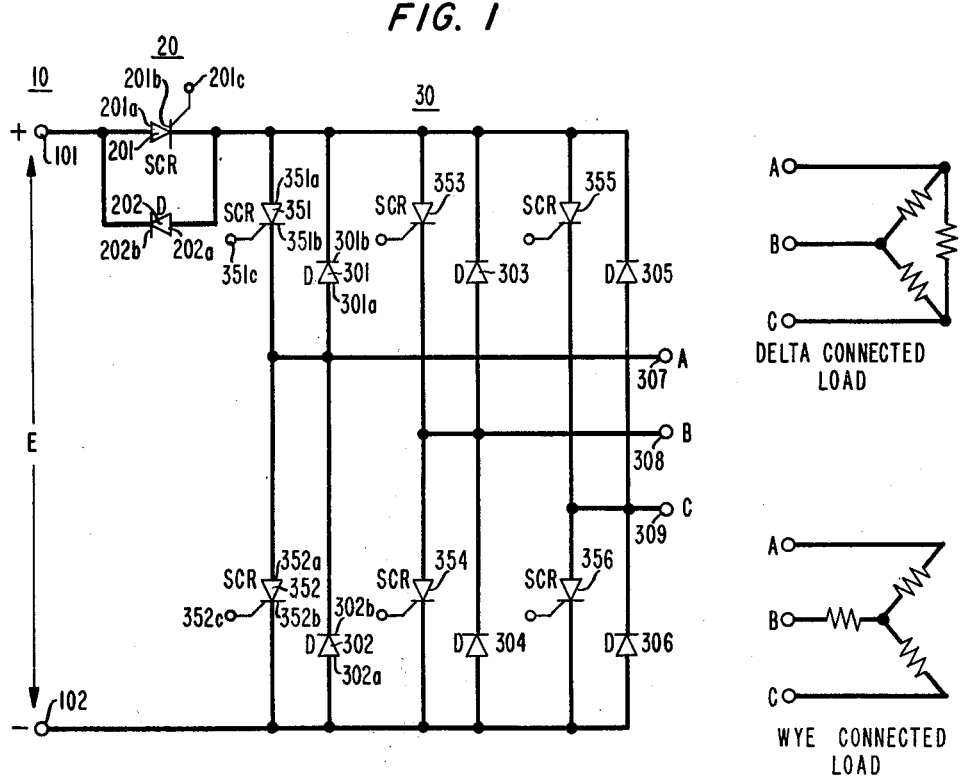

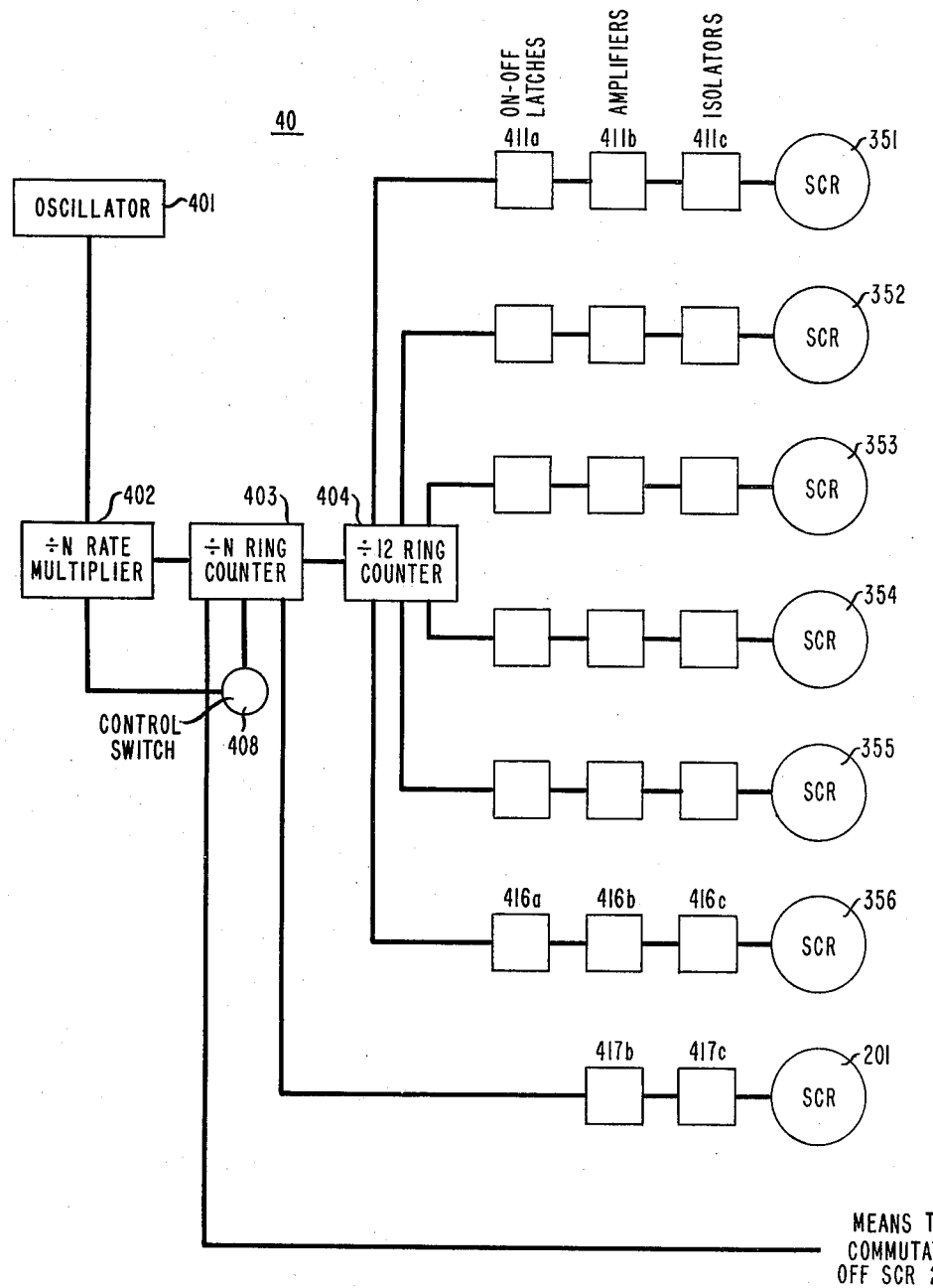

POLYPHASE VARIABLE FREQUENCY INVERTER WITH OUTPUT VOLTAGE CONTROL

FIELD OF THE INVENTION

This invention relates to a polyphase variable frequency inverter with output voltage control for providing a polyphase AC output from a constant potential DC supply.

BACKGROUND OF THE INVENTION

Several prior art inverter circuits have included silicon controlled rectifiers for providing a polyphase AC output from a constant potential DC supply. For example, U.S. Pat. No. 3,460,021 entitled, "Trapped Energy Recovery Circuit", issued on Aug. 5, 1969 to Schlabach; U.S. Pat. No. 3,469,169 entitled "Inverter Apparatus", issued on Sept. 23, 1969 to Schlabach et al; and U.S. Pat. No. 3,504,266 entitled "Inverter Apparatus Operative With Variable Input sources ", issued on Mar. 31, 1970 to Schlabach et al, are such prior art inverter circuits. However, such prior art inverter circuits include undesireable transformer means, capacitive means, and/or inductive reactance means. Further, in U.S. Pat. Nos. 3,321,697, 3,460,021, 3,469,169, and 3,504,266, there are utilized output matrices which require inverter grade silicon controlled rectifiers which in turn are used primarily as a means of conduction thereby requiring use of separate means to commutate such silicon controlled rectifiers OFF. In addition, the apparatus of U.S. Pat. No. 3,504,266 further requires a voltage sensing circuit on the constant positive DC supply. In U.S. Pat. No. 3,717,807, there are required multiple output bridges connected in parallel to provide multiple loads at one load per output bridge from one commutating circuit.

Objects of the present invention are therefore to provide:

A polyphase variable frequency inverter with output voltage control without the need for transformer means, capacitive means, and/or inductive reactance means;

A polyphase AC output from a constant potential DC supply without the need for transformer means, capacitive means, and/or inductive reactance means; and A polyphase variable frequency inverter with output voltage control which is advantageously adaptable to induction and synchronous motors.

SUMMARY OF THE INVENTION

According to the present invention, a polyphase variable frequency inverter with output voltage control provides a polyphase AC output from a constant potential DC supply and generally comprises a chopper circuit and an inverter circuit. The chopper circuit further comprises a silicon controlled rectifier in parallel with a reverse biased diode. The anode of the silicon controlled rectifier and the cathode of the reverse biased diode are connected to the positive terminal of the constant potential DC supply while the cathode of the silicon controlled rectifier and the anode of the reverse biased diode are connected to respective first silicon controlled rectifiers and reverse biased diodes of the inverter circuit. The inverter circuit further comprises a plurality of silicon controlled rectifier-reverse biased diode branches. Each such branch includes first and second silicon controlled rectifiers in series, the cathode of the second silicon controlled rectifier being connected to the negative terminal of the constant potential DC supply, the cathode of the first silicon controlled rectifier being connected to the anode of the second silicon controlled rectifier, and the anode of the first silicon controlled rectifier being connected to the positive terminal of the constant potential DC supply via the chopper circuit as aforesaid. Each such branch also includes first and second reverse biased diodes in series, the anode of the second reverse biased diode being connected to the negative terminal of the constant potential DC supply, the cathode of the second reverse biased diode being connected to the anode of the first reverse biased diode, and the cathode of the first reverse biased diode being connected to the positive terminal of the constant potential DC supply via the chopper circuit as aforesaid. Finally, the mid-point junction of each reverse biased diode series pair is connected to the mid-point junction of the respective silicon controlled rectifier series pair. For a three-phase system, the three-phase AC output is derived from linear combinations of pairs of the voltages appearing at the mid-point junctions of the three reverse biased diode-silicon controlled rectifier branches.

Features of the present invention are therefore that:

The inverter circuit exhibits a constant RMS polyphase AC output voltage to frequency slope characteristic according to a specific embodiment of the present invention;

It includes a chopper circuit whose turn-ON and turn-OFF cycles are independently controlled and which is coupled to a bridge matrix of silicon controlled rectifiers;

The rotating current waveform for the polyphase inverter output is generated by selectively gating either two or three of the bridge matrix silicon controlled rectifiers for a three-phase system;

The rotating curent waveform for the polyphase inverter output is generated by selectively gating ON either two or three of the bridge matrix silicon controlled rectifiers and then by initiating a current from the chopper circuit to complete the current through the load for a three-phase system;

Only twelve separate switching or timing intervals are required per cycle for a proper output waveform in a three-phase system;

The output RMS polyphase AC voltage is determined by the chopper circuit;

The output frequency is determined by the rate of switching of the silicon controlled rectifier bridge matrix;

There is required only a single pulse per step in this particular embodiment;

For any portion of the output cycle, at least two, but not more than three, silicon controlled rectifiers are gated ON during any one timing interval; and The inverter circuit of the present invention is optimized so as to minimize the number of silicon controlled rectifiers needed to perform the inversion function.

Advantages of the present invention are therefore that:

It is easily and economically adaptable as to the number N of phase, variable output frequency F, and variable output RMS polyphase AC voltage;

The chopper circuit requires only one set of commutating components;

The inverter circuit including the silicon controlled rectifier bridge matrix does not require inverter duty grade semi-conductors for the initiation (turn-ON) and commutation (turn-OFF) of current;

Only one single pulse per step is required;

There is not required transformer means, capacitive means; and/or inductive reactance means;

The polyphase AC output voltage is suitable and adaptable for most non-critical uses such as for induction and some synchronous motors;

The control circuit for the chopper circuit and the bridge matrix circuit can be integrated into one package with just two controls: a speed or frequency selector switch, and a run-stop (ON-OFF) switch to turn OFF the current to the load; and Utilization of an inverter circuit exhibiting a constant RMS polyphase AC output voltage to frequency slope characteristic is adaptable and applicable to most motor loads and can be varied for other purposes.

DESCRIPTION OF THE DRAWING

The above and other objects, features, and advantages of the present invention will be better appreciated by consideration of the following detailed description and the drawing in which:

FIG. 1 is a schematic diagram of a specific embodiment of the present invention;

FIG. 2 is an inverter bridge matrix switching sequence table used in explaining the operation of the present invention;

FIG. 5 is a schematic block diagram of the external control circuit for the chopper circuit and inverter circuit of the present invention.

DETAILED DESCRIPTION

Figure 3A:
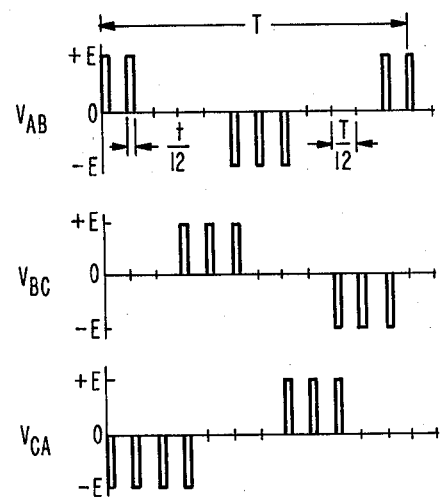
FIGS. 3A and 3B are waveform diagrams of the inverter circuit output at no load for low frequency and high frequency, respectively, used in explaining the operation of the present invention.

FIG. 1 is a schematic diagram of polyphase variable frequency inverter with output voltage control 10 comprising chopper circuit 20 and inverter circuit 30. Circuit 10 is responsive to constant potential DC supply voltage E across positive terminal 101 and negative terminal 102 and produces polyphase AC output voltages across pairs of terminals 307, 308, and 309. Chopper circuit 20 further comprises controlled switching device or silicon controlled rectifier (SCR) or thyristor 201 and reverse biased diode 202. SCR 201 includes anode 201A connected to positive terminal 101 while reverse biased diode 202 includes cathode 202B also connected to positive terminal 101. Cathode 201B of SCR 201 and anode 202A of reverse biased diode 202 are connected to each other and to inverter circuit 30 as shall be hereinafter explained. It is therefore apparent that SCR 201 and reverse biased diode 202 are in parallel to each other relative to positive terminal 101 and to inverter circuit 30. It will be apparent to those skilled in the art that chopper circuit 20 may comprise a silicon controlled rectifier, a transistor, or any other static power device.

Inverter circuit 30 further comprises a plurality of associated SCR-reverse biased diode branches. Each such reverse biased diode is in parallel with its associated SCR and the mid-point junction of each such SCR-reverse biased diode branch provides an output terminal for the given three-phase system.

In particular, the first associated SCR-reverse biased diode branch comprises reverse biased diode 301, reverse biased diode 302, SCR 351, and SCR 352.

SCR 351 is in series with SCR 352 such that anode 351A of SCR 351 is connected to positive terminal 101 via chopper circuit 20, cathode 351B of SCR 351 and anode 352A of SCR 352 are connected to each other at the mid-point junction, and cathode 352B of SCR 352 is connected to negative terminal 102. Similarly, anode 302A of reverse biased diode 302 is connected to negative terminal 102, cathode 302B of reverse biased diode 302 is connected to anode 301A of reverse biased diode 301 at the same mid-point junction, and cathode 301B of reverse biased diode 301 is connected to positive terminal 101 via chopper circuit 20. The mid-point junction connecting cathode 302B with anode 301A is the same as the mid-point junction connecting cathode 351B with anode 352A. In turn, output terminal 307 is commonly derived from such common mid-point junction. Thyristors 351 and 352 also respectively include gates 351C and 352C. A similar explanation applies to the reverse biased diode-SCR branch comprising reverse biased diodes 303 and 304 and thyristors 353 and 354 from which is commonly derived output terminal 308. A similar explanation applies to the reverse biased diode-SCR branch comprising reverse biased diodes 305 and 306 and thyristors 355 and 356 from which is commonly derived output terminal 309. Diodes 301 through 306 are utilized to return excess energy back to the source from the load. Diode 201 also includes gate 201 C.

FIG. 2 is the inverter bridge matrix switching sequence table used in explaining the operation of the present invention. For simplicity of explanation, terminal 307 is further designated as terminal A, terminal 308 is further designated as terminal B, and terminal 309 is further designated as terminal C. The switching sequence table of FIG. 2 denotes: time intervals 1 through 12 along the top row; the polarity, if any, on terminals A, B, and C during each of said 12 time intervals; and the switch (ON-OFF) status of thyristors 351, 352, 353, 354, 355, and 356 during such 12 time intervals. An "x" in the table denotes that the respective thyristor is conducting. It is apparent from the switching sequence table of FIG. 2 that for the three-phase system of FIG. 1, only 12 pulse or time intervals per cycle for the respective six thyristors is necessary. It is also apparent from the switching sequence table that during any given time interval that either two or three thyristors are switched ON; that during any such time interval there is always at least one terminal of positive polarity and at least one terminal of negative polarity; that during each such time interval, whenever a given terminal has no polarity thereon, one remaining terminal has a positive polarity and one remaining terminal has a negative polarity; that during each such time interval, when there is no terminal having no polarity, two of such terminals have a given polarity and the third terminal has the opposite polarity; that a given terminal shall have the same polarity for five consecutive time intervals followed by a time interval of no polarity followed by five consecutive time intervals of the opposite polarity; that such five consecutive time intervals at a given terminal are followed by another five consecutive time intervals of said polarity on the first terminal coinciding with the first time interval of such polarity on the next terminal; that each thyristor is switched ON for five consecutive time intervals followed by seven consecutive time intervals of being switched OFF; that the five switched ON time intervals of a given thyristor are followed by five time intervals of being switched ON for the associated branch thyristor with a common switched OFF time interval in between the fifth time interval of the first thyristor and the first time interval of the associated branch thyristor; that the five consecutive time intervals of being switched ON for a given thyristor are followed by another five consecutive time intervals of being switched ON for the corresponding thyristor of the following or adjacent thyristor branch, the fifth switched ON time interval of a given thyristor being the same as the first switched ON time interval of the following thyristor. Accordingly, utilizing external control circuits to effect the switching pattern of thyristors 351 through 356 as shown on the switching sequence table of FIG. 2 yields the polarity sequence for terminals 307 through 309. For the three-phase system of FIG. 1, the desired three-phase output is derived from linear combinations of pairs of voltages appearing across terminals 307, 308, and 309.

Figure 3B:
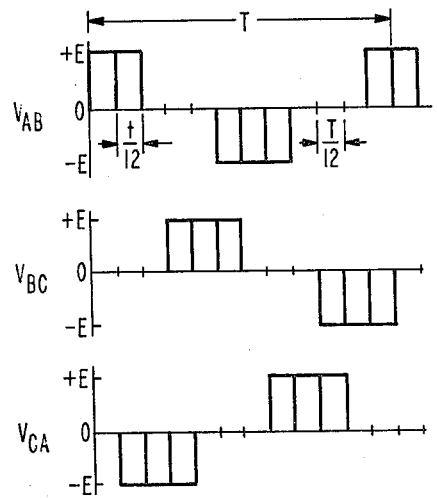

FIGS. 3A and 3B are waveform diagrams for inverter circuit 30 at output terminals 307, 308, and 309 at no load for low switching frequency and high switching frequency, respectively, of thyristors 351 through 356. The total period T comprises the aforementioned 12 time intervals. The magnitude E is equivalent to constant potential DC voltage E appearing across positive terminal 101 and negative terminal 102. The polyphase AC output voltage appearing across terminals 307 and 308 is designated as voltage $V_{AB}$, the voltage appearing across terminals 308 and 309 is designated as voltage $V_{BC}$, and the voltage appearing across terminals 309 and 307 is designated as voltage $V_{CA}$. It should be noted that the peak magnitude of each such voltage is either zero or E while the polarity of each such voltage is as derived from the switching sequence table of FIG. 2.

Figure 4A:
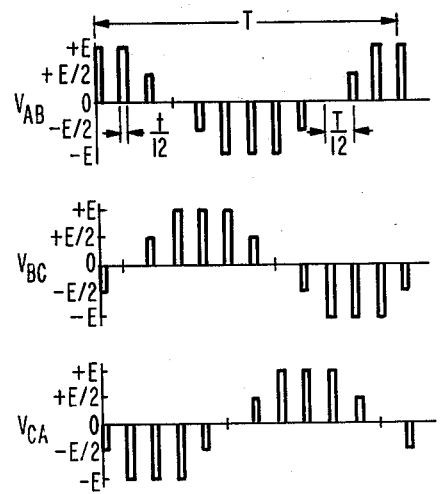
FIGS. 4A and 4B are waveform diagrams of the inverter circuit output at load for low frequency and high frequency, respectively, used in explaining the operation of the present invention.
Figure 4B:
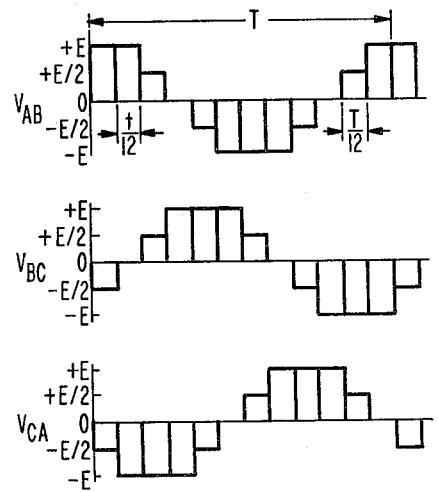

FIGS. 4A and 4B are waveform diagrams for inverter circuit 30 at output terminals 307, 308, and 309 at load for low frequency and high frequency, respectively. Again, the total period T comprises the aforementioned 12 time intervals. The output voltages appearing across respective combinations of terminals 307, 308, and 309 are again designated as $V_{AB}$, $V_{BC}$, and $V_{CA}$. It should be noted that the peak magnitude of each such output voltage across pairs of such output terminals may have a magnitude of zero, E/2, or E. The E/2 voltage magnitude is present whenever either of output terminals 307, 308, or 309 is not connected by a conducting thyristor to either positive terminal 101 or negative terminal 102; and the E voltage magnitude is present across the other two output terminals. Accordingly, there is effected a voltage divider action on the unconnected output terminal via a delta or wye connected load as reflected in FIG. 1. Again, the respective polarities of each such voltage is as derived from the switching sequence table of FIG. 2.

FIG. 5 is a schematic block diagram of external control circuit 40 for controlling chopper circuit 20 and inverter circuirt 30 of FIG. 1 according to the present invention. Control circuit 40 comprises oscillator 401, multiplier 402, ring counter 403, ring counter 404, control switch 408, ON-OFF latches 411A through 416A, amplifiers 411B through 417B, and isolators 411C through 417C. Multiplier 402 is responsive to oscillator 401 and to control switch 408, ring counter 403 is responsive to multiplier 402 and to control switch 408, and ring counter 404 is responsive to ring counter 403. Respective isolators 411C through 417C are responsive to respective amplifiers 411B through 417B, respective amplifiers 411B through 416B are responsive to respective ON-OFF latches 411A through 416A, and ON-OFF latches 411A through 416A are responsive to ring counter 404. Respective amplifier 417B is responsive to ring counter 403. Finally, SCR gates 351C through 356C of respective thyristors 351 through 356 are responsive to respective isolators 411C through 416C. Isolators 411C through 416C produce a second series of timing signals for thyristors 351 through 356 while ring counter 403 produces a first series of timing signals for gating ON thyristor 201 directly, and a second series of timing signals to commutate OFF thyristor 201 via auxiliary means.

In FIG. 5, the output of rate multiplier 402 serves as the clock input to ring counter 403. Main conducting thyristor 201 of chopper circuit 20 is gated ON by the first pulse from ring counter 403 after the pulse from ring counter 404. Main conducting thyristor 201 is commutated OFF via auxiliary means by the second pulse from ring counter 403. Control circuit 40 also includes a control element to prevent triggering of thyristor 201 when current through inverter 10 is not desired, such as when changing frequencies. Control switch 408 serves as inverter 10 ON-OFF and speed control switch. The third output of ring counter 403 is used as the clock input to ring counter 404 which in turn gates thyristors 351 through 356 in accordance with the switching sequence table of FIG. 2. The outputs of ring counter 404 are fed to set-reset latches 411A through 416A which gate each thyristor of matrix 30 in its turn, there being one set-reset latch per thyristor.

It is therefore apparent that polyphase variable frequency inverter 10 with output voltage control is responsive to constant potential DC supply voltage E to produce a polyphase AC output across terminals 307, 308, and 309 as is shown in FIGS. 4A and 4B. It is further apparent that the output voltage across terminals 307, 308, and 309 can be adjusted for both frequency F and RMS voltage V. In the particular case of FIG. 1, polyphase variable frequency inverter 10 exhibits a constant RMS voltage V to frequency F slope characteristic which is best adaptable for induction and synchronous motors. However, it will be apparent to those skilled in the art that by modifying control circuit 40 of FIG. 5, other combinations of voltage V and frequency F can be generated. Generally, the object of the present invention is accomplished by coupling chopper circuit 20, whose turn-ON and turn-OFF cycles are independently controlled, to bridge matrix 30 of silicon controlled rectifiers or thyristors as is shown in FIG. 1. The rotating current waveform across output terminals 307, 308, and 309 is generated by selectively gating ON at least two of the bridge matrix thyristors 351 through 356, then by initiating a current through chopper circuit 20 to complete the current through the load attached to output terminals 307, 308, and 309. Chopper circuit 20 is adapted to interrupt the current at the proper instant, then the next of thyristors 351 through 356 is gated ON. The output voltage V across terminals 307, 308, and 309 is determined by chopper circuit 20. The longer the power pulse applied to chopper circuit 20 in each cycle, the higher the RMS voltage V for that cycle. This is known as pulse width modulation and is governed by Equation 1 as follows:

$$V_{RMS} \text{ (output)} = V_{DC} \text{ (source)} \sqrt{\frac{t}{T}} \quad (1)$$

Where:
$V_{RMS}$ (output)=desired output voltage at a given frequency expressed in root-mean-square voltage;
$V_{DC}$ (source)=available constant potential direct current voltage to be applied to inverter;
t=time in seconds that thyristor 201 is conducting per period T;

$$T = \frac{1}{\text{frequency in Hz of the output voltage}}$$

= time in seconds of one complete cycle of output voltage

Since both t and T are over the entire cycle, these values must be each divided by twelve in this case to determine the proper timing intervals for each of the twelve steps shown in FIGS. 2, 3, and 4. Rate multiplier 402 provides period t/12 while the combination of rate multiplier 402 and ring counter 403 provide period T/12. Ring counter 404 uses the output of ring counter 403 to determine period T. See FIG. 5.

Output frequency F exhibited across terminals 307, 308, and 309 is governed by the rate of switching of thyristor bridge matrix 30 as shown in the switching sequence table of FIG. 2.

From the above, the following advantages of the present invention are apparent: Only one set of commutating components is required for chopper circuit 20; thyristor bridge matrix 30 does not require inverter duty grade semi-conductors for the initiation turn-ON and commutation turn-OFF of current, which requirement is handled by chopper circuit 20; the use of a single pulse per step reduces the commutation power loss in chopper circuit 20, for low output voltage V there being a very narrow pulse width and for high output voltage V there being a very wide pulse width; and, no transformer is required since the output across terminals 307, 308, and 309 can be fed directly to the associated load.

Output voltage V as shown in FIGS. 3A and 3B is suitable for most non-critical uses such as an induction and some synchronous motors, although such output voltage V is in square wave form. For certain critical applications where a sinewave potential is required, a filter can be added to output terminals 307, 308, and 309.

The principles of the present invention applied to inverter 10 of FIG. 1 can be used with two basic types of available chopper circuits: those of the load sensitive type where some residual current continues to flow from the chopper circuit through the load for a period of time after the main conducting device has been commutated OFF; and those of the load insensitive type where no residual current flows through the load after the main conducting device has been commutated OFF. For load sensitive chopper use, the next switching pulse to the bridge matrix must wait until the residual current has vanished. For load insensitive chopper use, the next switching pulse to the bridge matrix can be initiated as soon as the main conducting device of the chopper circuit has resumed its forward blocking state.

Also, chopper circuit 20 may comprise a single device capable of commutating OFF on signal without auxiliary commutative means via a second signal as in a conventional chopper, or by removal of the gate signal for commutation of the device. The latter can be accomplished herein by an ON-OFF latch similar to latch 411A. Such devices are still in the research stage and are not yet commercially available in the requisite power range.

Free-wheeling diodes are placed in reverse bias as shown in FIG. 1 across each thyristor in bridge matrix 30 and across main conducting device 201 of chopper circuit 20 to accomplish the following: to pass reactive energy from the load back to the source for prevention of damage to the bypassed devices, for example during low power factor operation; and to enable inverter 10 to act as a rectifier, for example, to recharge a battery from a regenerating motor.

From FIG. 1 it will be apparent to those skilled in the art that for an N-phase system, 2X N thyristors are required for the output matrix of the inverter. For any timing interval of the switching cycle either two or three, for N=3, or either two, three, or four, for N=4 or more, thyristors are gated ON during any one time interval.

From the switching sequence table of FIG. 2, it is apparent that the output voltages across respective output terminals 307, 308, and 309 must advance sequentially from timing interval to timing interval or from phase to phase in order to generate the required circular pattern of the polyphase system. This is also apparent from FIGS. 3A, 3B, 4A, and 4B.

Inverter 10 of FIG. 1 is optimized to include the minimum number of components needed to perform the subject inversion function. However, it will be apparent to those skilled in the art that other circuit configurations may optimize as to the output waveform to produce somewhat more of a sinewave, may optimize on the minimum harmonic content of the output waveform, and may optimize on the minimum energy loss in the commutation cycle.

While the arrangement according to the present invention has been described in terms of a specific embodiment, it will be apparent to those skilled in the art that many modifications are possible within the spirit and scope of the disclosed principal.

What is claimed is:

1. An inverter apparatus being jointly responsive to a constant potential signal from a direct current source and to a plurality of timing signals from an external control circuit for providing a three-phase alternating current signal to a load, said inverter apparatus comprising:

a chopper circuit including at least one controlled switching device being jointly responsive to said direct current signal and to a first timing signal at the rate $F_1$ from said control circuit for selectively producing a plurality of unidirectional pulses at said rate $F_1$; and an inverter circuit including three controlled switching device branches in parallel with each other, each such branch further including first and second controlled switching devices in series with each other, each such first controlled switching device being connected to said chopper circuit and to said second controlled switching device and being jointly responsive to said unidirectional pulses at the rate $F_1$ and to a second timing signal at the rate $F_2$ from said control circuit; each such second controlled switching device being connected to said direct current signal source and to said first controlled switching device and being jointly responsive to the output signal of said first controlled switching device, to a third timing signal at the rate $F_2$ from said control circuit, and to said direct current signal, whereby a plurality of bi-directional pulses at the rate $F_3$ are selectively produced at the mid-point junction of each such controlled switching device branch, and whereby linear combinations of the voltages appearing at selected pairs of said mid-point junctions produce said three-phase alternating current signal;

either two or three of said inverter circuit controlled switching devices being gated ON at said rate $F_2$, then said chopper circuit controlled switching device being gated ON at said rate $F_1$, then said chopper circuit controlled switching device being gated OFF at said rate $F_1$, and then said two or three inverter circuit controlled switching devices being gated OFF at said rate $F_2$ when the residual current therein is substantially reduced.

2. The inverter apparatus of claim 1 wherein said chopper circuit controlled switching device is a silicon controlled rectifier.

3. The inverter apparatus of claim 1 wherein said inverter circuit controlled switching devices are silicon controlled rectifiers.

4. The inverter apparatus of claim 1 wherein said chopper circuit also includes a unidirectional device in parallel with said controlled switching device.

5. The inverter apparatus of claim 4 wherein said unidirectional device is a reverse biased diode.

6. The inverter apparatus of claim 1 wherein said inverter circuit also includes a unidirectional device in parallel with each such controlled switching device.

7. The inverter apparatus of claim 6 wherein each such unidirectional device is a reverse biased diode.

8. The inverter apparatus of claim 7 wherein said timing signals at the rate $F_2$ activate their associated controlled switching devices and do not activate each such associated controlled switching devices in a given branch for five consecutive timing intervals and do not activate each such associated controlled switching device for the following seven consecutive timing intervals; wherein the other associated branch controlled switching device is not activated during said five consecutive timing intervals; wherein either 1 or 2 others of the remaining four controlled switching devices are activated during said five consecutive timing intervals; wherein the first controlled switching device of each branch is activated during the fifth activated timing interval of the first controlled switching device of an adjacent branch; and wherein the second controlled switching device of each branch is activated during the fifth activated timing interval of the second controlled switching device of an adjacent branch.

* * * * *